(12) United States Patent
Carmichael et al.

(10) Patent No.: US 11,220,589 B2
(45) Date of Patent: Jan. 11, 2022

(54) METHOD OF DECREASING ALDEHYDE CONTENT IN A POLYMERIC MATERIAL

(71) Applicant: COLORMATRIX HOLDINGS, INC., Wilmington, DE (US)

(72) Inventors: Adrian Carmichael, Yorkshire (GB); Andrew Overend, Bolton (GB); Matthew Jackson, Warrington (GB); Steven Tattum, Lancashire (GB)

(73) Assignee: ColorMatrix Holdings, Inc., Wilmington, DE (US)

( * ) Notice: Subject to any disclaimer, the term of this patent is extended or adjusted under 35 U.S.C. 154(b) by 67 days.

(21) Appl. No.: 16/752,880

(22) Filed: Jan. 27, 2020

(65) Prior Publication Data

US 2020/0157311 A1    May 21, 2020

Related U.S. Application Data

(63) Continuation of application No. 15/754,084, filed as application No. PCT/IB2016/054999 on Aug. 22, 2016, now Pat. No. 10,557,017.

(30) Foreign Application Priority Data

Aug. 21, 2015 (GB) .................................. 1514937

(51) Int. Cl.
| | |
|---|---|
| *C08K 5/20* | (2006.01) |
| *C08K 5/16* | (2006.01) |
| *C08L 23/02* | (2006.01) |
| *C08L 67/02* | (2006.01) |
| *C08L 75/04* | (2006.01) |

(52) U.S. Cl.
CPC .................. *C08K 5/20* (2013.01); *C08K 5/16* (2013.01); *C08L 23/02* (2013.01); *C08L 67/02* (2013.01); *C08L 75/04* (2013.01); *C08K 2201/00* (2013.01); *C08K 2201/012* (2013.01); *C08L 2203/10* (2013.01)

(58) Field of Classification Search
USPC ................................ 524/284; 428/34.1, 35.7
See application file for complete search history.

(56) References Cited

U.S. PATENT DOCUMENTS

| | | | | |
|---|---|---|---|---|
| 4,191,796 A | * | 3/1980 | Eckhoff ................... | B05D 7/08 427/408 |
| 2010/0233406 A1 | * | 9/2010 | Andrews ................. | C08L 67/02 428/36.92 |

FOREIGN PATENT DOCUMENTS

JP    2011167591 A    9/2011

* cited by examiner

*Primary Examiner* — Terressa Boykin
(74) *Attorney, Agent, or Firm* — Fay Sharpe LLP

(57) ABSTRACT

A method of decreasing aldehyde content in polymeric materials, for example in bottles comprising polyethylene terephthalate, uses a compound (A) which comprises first, second and third fragments which comprise a moiety Formula A) (A) and a moiety. (Formula B) NH (B).

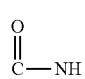

(A)

16 Claims, No Drawings

METHOD OF DECREASING ALDEHYDE CONTENT IN A POLYMERIC MATERIAL

This inventions relates to polymeric materials and particularly, although not exclusively, relates to polyester, for example polyethylene terephthalate, and additives therefor.

Polyethylene terephthalate (PET) is used on a large scale for the manufacture of food packages such as bottles. Such bottles are widely utilised for packaging of beverages, such as carbonated soft drinks, beer, or mineral water. The technique commonly used to manufacture bottles from PET (ie. to convert the PET into a predetermined shape from a raw material stage) generally involves a two stage process. In the first stage granules of the PET are injection moulded to make a preform. In the second stage the preform is blow moulded to the desired shape.

The softening point of PET is high. Thus a typical temperature needed for processing of PET is in the region of 260° C. to 285° C. A recognised problem in the industry is that, under the high temperatures and shear conditions needed for injection moulding to make a preform and for blow moulding of the preform to make a bottle, PET tends to degrade, resulting in the formation of acetaldehyde. The presence of acetaldehyde in the material of the finished bottle is undesirable, particularly when the bottle is to be used for products for human consumption, because the acetaldehyde can migrate from the walls of the package or bottle into its contents, whereupon it adversely affects the flavour and fragrance properties of the comestible product. Although the migration of acetaldehyde from a PET bottle into a carbonated drink is undesirable, a trace of acetaldehyde can often be tolerated because the taste and fragrance of the drink are not usually noticeably affected. However, the presence of even minute amounts of acetaldehyde in a non-carbonated drink, such as still mineral water, tends to impart a most undesirable adverse taste and odour to the drink.

It is known to add acetaldehyde scavengers to PET prior to or during melt-processing to scavenge acetaldehyde which may be produced by degradation of the PET. However, there are various competing requirements associated with selection and use of acetaldehyde scavengers. For example, the weight of acetaldehyde scavenger incorporated into the PET needs to be sufficiently high to scavenge a high amount of acetaldehyde. However, higher levels of additives incorporated into PET can be detrimental to optical properties of the PET. For example, high levels of additives may detrimentally impact L* (i.e. reduce L*) or haze (i.e. increase haze) which is undesirable, particularly when the PET is used for mineral water bottles where aesthetics are particularly important. Additionally, it is important for an acetaldehyde scavenger not itself to migrate significantly from the PET, since this can undesirably enter a beverage contained in a bottle made from the PET.

It is an object of the present invention to address the above-described problems.

According to a first aspect of the invention, there is provided a method of decreasing aldehyde content in a polymeric material, the method comprising the step of contacting the polymeric material with a compound (A) which includes:

(I) a first fragment which comprises a moiety

(A)

and a moiety

NH  (B)

wherein the carbon atom of moiety (A) and the nitrogen atom of moiety (B) are separated by at least one and not more than two atoms;

(II) a second fragment which comprises a moiety

(A)

and a moiety

NH  (B)

wherein the carbon atom of moiety (A) and the nitrogen atom of moiety (8) are separated by at least one and not more than two atoms; and (III) a third fragment which comprises a moiety

(A)

and a moiety

NH  (B).

It has been found that preferred compounds (A) exhibit an advantageous compromise in providing high levels of acetaldehyde scavenging at acceptable additional rates in PET, whilst not significantly impacting optical properties (e.g. L* and haze) and exhibiting a low level of migration from the PET.

In said first fragment, the carbon atom of moiety (A) and the nitrogen atom of moiety (B) are separated by at least one and not more than two carbon atoms. The or both of said carbon atoms which separate moieties (A) and (B) is preferably unsaturated. The carbon atom of moiety (A) and the nitrogen atom of moiety (B) are preferably separated by two atoms which are preferably carbon atoms and are preferably both unsaturated carbon atoms. The carbon atom of moiety (A) and the nitrogen atom of moiety (B) are preferably bonded to an aromatic moiety for example a benzene moiety. The moiety (B) is preferably bonded to a carbon atom of the benzene moiety which is ortho to the carbon atom to which the moiety (A) is bonded.

Said first fragment may comprise a moiety:

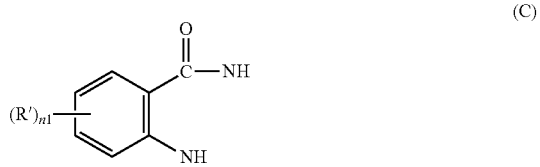
(C)

wherein R' represents a substituent and n1 is 0 to 4, for example 0 to 1 and, preferably, n1 is 0. R' may be an optionally-substituted alkyl group, for example an optionally-substituted $C_{1-20}$, for example $C_{1-10}$ alkyl group. R' may be arranged to improve the compatibility of compound (A) in the polymeric material with which it is contacted in the method, for example by virtue of R' including relevant functional groups to improve compatibility. Alternatively and/or additionally, R' may be arranged to increase the mass of the compound (A).

Moiety (B) is preferably NH₂ and/or the NH moiety bonded to the benzene moiety is preferably NH₂.

The moiety (C) is suitably capable of reacting with aldehyde in a condensation reaction to produce a moiety

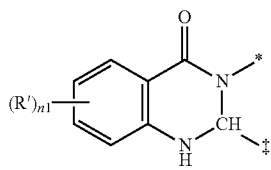
(D)

wherein the bond with a * represents the attachment of moiety (D) to another part of compound (A) and the bond with a ‡ represents part of the aldehyde which reacts with moiety (C). When the level of acetaldehyde is reduced in the method, compound (D) may be of formula

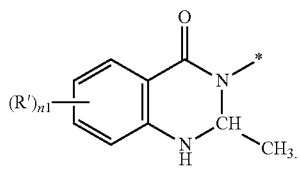

Thus, by virtue of the reaction, the aldehyde (e.g. acetaldehyde) is scavenged and its residue becomes covalently bonded into the compound (A).

In said second fragment, the carbon atom of moiety (A) and the nitrogen atom of moiety (B) are separated by at least one and not more than two carbon atoms. The or both of said carbon atoms which separate moieties (A) and (B) is preferably unsaturated. The carbon atom of moiety (A) and the nitrogen atom of moiety (B) are preferably separated by two atoms which are preferably carbon atoms and are preferably both unsaturated carbon atoms. The carbon atom of moiety (A) and the nitrogen atom of moiety (B) are preferably bonded to an aromatic moiety for example a benzene moiety. The moiety (B) is preferably bonded to a carbon atom of the benzene moiety which is ortho to the carbon atom to which the moiety (A) is bonded.

Said second fragment may comprise a moiety:

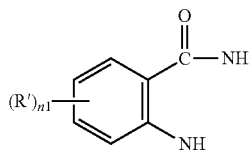
(C)

wherein R' represents a substituent and n1 is 0 to 4, for example 0 to 1 and, preferably, n1 is 0. R' may be a optionally-substituted alkyl group, for example an optionally-substituted $C_{1-20}$, for example $C_{1-10}$ alkyl group. R' may be arranged to improve the compatibility of compound (A) in the polymeric material with which it is contacted in the method, for example by virtue of R' including relevant functional groups to improve compatibility. Alternatively and/or additionally, R' may be arranged to increase the mass of the compound (A).

Moiety (B) of said second fragment is preferably NH₂ and/or the NH moiety bonded to the benzene moiety is preferably NH₂.

In said third fragment, the carbon atom of moiety (A) and the nitrogen atom of moiety (B) are separated by at least one and not more than two carbon atoms. The or both of said carbon atoms which separate moieties (A) and (B) is preferably unsaturated. The carbon atom of moiety (A) and the nitrogen atom of moiety (B) are preferably separated by two atoms which are preferably carbon atoms and are preferably both unsaturated carbon atoms. The carbon atom of moiety (A) and the nitrogen atom of moiety (B) are preferably bonded to an aromatic moiety for example a benzene moiety. The moiety (B) is preferably bonded to a carbon atom of the benzene moiety which is ortho to the carbon atom to which the moiety (A) is bonded.

Said third fragment may comprise a moiety:

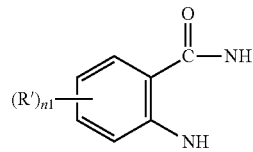
(C)

wherein R' represents a substituent and n1 is 0 to 4, for example 0 to 1 and, preferably, n1 is 0. R' may be a optionally-substituted alkyl group, for example an optionally-substituted $C_{1-20}$, for example $C_{1-10}$ alkyl group. R' may be arranged to improve the compatibility of compound (A) in the polymeric material with which it is contacted in the method, for example by virtue of R' including relevant functional groups to improve compatibility. Alternatively and/or additionally, R' may be arranged to increase the mass of the compound (A). Moiety (B) of said third fragment is preferably NH₂ and/or the NH moiety bonded to the benzene moiety is preferably NH₂.

When compound (A) is not a polymer it may have a molecular weight of at least 400 Daltons, preferably at least 500 Daltons, more preferably at least 600 Daltons, especially at least 700 Daltons; or when compound (A) is a polymer it may have a number average molecular weight (Mn) determined by GPC of at least 450 Daltons, preferably at least 500 Daltons, more preferably at least 600 Daltons.

Said compound (A) may be a solid or a liquid at 25° C. Said compound (A) is preferably such that it is a non-gaseous fluid (e.g. a liquid) when at the temperature at which the polymeric material melts. It is preferably a liquid at 250° C.

Said first fragment, said second fragment and said third fragment are preferably bonded to a main fragment of compound (A), suitably via the nitrogen atoms of moiety CO.NH of respective moieties (A) of said first fragment, said second fragment and said third fragment. In a preferred embodiment, said compound (A) consists essentially of said first fragment, said second fragment, said third fragment and said main fragment.

Said main fragment may have a molecular weight (or a number average molecular weight (Mn) determined by GPC when the main fragment is polymeric) of more than the molecular weight of said first fragment. The sum of the molecular weights of the first, second and third fragments may be less than the molecular weight (or number average molecular weight (Mn) determined by GPC when the main fragment is polymeric) of said main fragment. Said main fragment may have a molecular weight of at least 400 Daltons (or a number average molecular weight (Mn) determined by GPC when the main fragment is polymeric of at least 400 Daltons). The main fragment may have a molecular weight (or Mn) of less than 10000 Daltons, for example less than 7000 Daltons.

Said main fragment may include only carbon, hydrogen and oxygen atoms and, optionally, nitrogen atoms.

The main fragment may include one or more additional fragments which comprise a moiety

(A)

and a moiety

NH    (B)

as described above for said first fragment. For example, the main fragment may include one or more additional fragments which include a moiety:

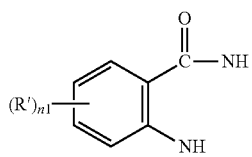
(C)

wherein R' and n1 are as described above. Moiety (B) is preferably $NH_2$ and/or the NH moiety bonded to the benzene moiety is preferably $NH_2$.

Preferably, said main fragment includes substantially no primary amine moieties ($-NH_2$) except primary amine moieties which are separated from a carbonyl moiety (CO=O) by at least one and not more than two atoms. Thus, preferably, the only primary amine moieties in said main fragment (and preferably in said compound (A)) are primary amine moieties within fragments (e.g. of said first, second, third or additional fragments) which comprise a moiety

(A)

and a moiety

NH    (B)

wherein the carbon atoms of moiety (A) and the nitrogen atom of moiety (B) are separated by at least one and not more than two atoms. By only providing primary amine moieties as described, formation of coloured Schiff's bases on reaction of acetaldehyde with compound (A) may be avoided. Consequently, in the method, colour formation in the polyester during acetaldehyde scavenging may be minimised.

Optionally, said main fragment (and/or said compound (A)) may include one or more secondary or tertiary amine moieties; or may include one or more aromatic nitrogen atoms.

Except for any aromatic carbon atoms and carbonyl moieties, said main fragment (and/or said compound (A)) preferably does not include any unsaturated carbon atoms.

Said main fragment (and/or said compound (A)) preferably does not include any alkenyl or alkynyl groups.

Said main fragment (and/or said compound (A)) preferably does not include any sulphur atoms or sulphur-containing groups.

Said main fragment (and/or said compound (A)) preferably does not include any halogen atoms or halogen-containing groups.

Said main fragment (and/or said compound (A)) preferably includes a moiety:

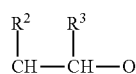
(E)

wherein $R^2$ and $R^3$ independently represent a hydrogen atom or an optionally-substituted, preferably unsubstituted, alkyl group. An alkyl group may be a $C_{1-4}$ alkyl group, preferably a $C_{1-2}$ alkyl group. $R^2$ and $R^3$ preferably independently represent a hydrogen atom or a $C_{1-2}$ alkyl, preferably a methyl group. More preferably, $R^2$ and $R^3$ independently represent a hydrogen atom or a methyl group. Preferably one of $R^2$ and $R^3$ represents a hydrogen atom and the other represents a hydrogen atom or methyl group. Said compound (A) may include at least 2 or at least 4 of moieties (E). It may include less than 20 or less than 10 of moieties (E).

In one preferred embodiment, said main fragment may consist of carbon and hydrogen atoms and one (and only one) other type of atom selected from oxygen and nitrogen atoms. For example, the main fragment may include only three types of atoms—either carbon, hydrogen and oxygen atoms or carbon, hydrogen and nitrogen atoms. In said one preferred embodiment, said main fragment is preferably saturated. In said one preferred embodiment, said main fragment does not include any aromaticity. In said one preferred embodiment, said main fragment includes a multiplicity of moieties of formula $-CH_2CHR^{50}-$ where $R^{50}$ represents a hydrogen atom or a $C_{1-4}$, preferably a $C_{1-2}$, alkyl group, which alkyl group is preferably unsubstituted.

In a first embodiment, said main fragment may include carbon, hydrogen and oxygen atoms only. Said main fragment may be saturated. Oxygen atoms may be present as ether moieties. Preferably, in said main fragment, oxygen atoms are only present as ether moieties. Carbon and hydrogen atoms may be present as saturated hydrocarbon moieties. Said main fragment may include a moiety:

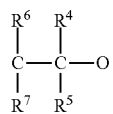
(F)

wherein $R^4$, $R^5$, $R^6$ and $R^7$ independently represent a hydrogen atom or an optionally-substituted, preferably unsubstituted, alkyl group. An alkyl group may be a $C_{1-4}$ alkyl group, preferably a $C_{1-2}$ alkyl group. Said moiety (F) may include 2 to 10, preferably 2 to 6, more preferably 2 to 4 carbon atoms in total. Preferably $R^5$ and $R^7$ represent hydrogen atoms. Preferably one of $R^4$ and $R^6$ represents a hydrogen atom; the other of $R^4$ and $R^6$ may represent a $C_{1-4}$, for example a $C_{1-2}$, unsubstituted alkyl group, especially a methyl group.

Said moiety (F) may represent a repeat unit of the main fragment and/or of compound (A).

A main fragment which includes moiety (F) may include, on average, at least 4 or at least 5 (and preferably less than 20 or less than 10) moieties of formula (F) wherein, preferably, the at least 4 or at least 5 moieties of formula (F) are identical.

In said first embodiment, said main fragment may be of formula:

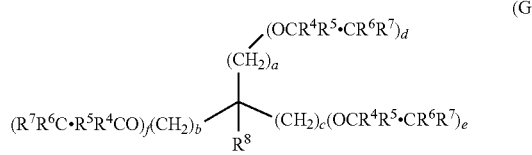

(G)

wherein $R^4$, $R^5$, $R^6$, and $R^7$ are as described above; a, b and c independently represent 0 or 1 (but preferably represent 1); and $R^8$ represents an optionally-substituted (preferably unsubstituted) alkyl group, suitably a $C_{1-6}$, preferably a $C_{1-4}$, especially a $C_{1-2}$, unsubstituted alkyl group. d, e and f suitably represent integers, wherein, on average, the sum of d, e and f in moiety (G) is in the range 3 to 20, for example 3 to 10. In moiety (G), the respective carbon atoms which carry groups $R^6/R^7$ are suitably bonded to respective first, second and third fragments via the nitrogen atoms of moieties CO.NH of such fragments, for example fragments (C).

Jeffamine and Eipkure, described hereinafter, are examples of amines which may be reacted to produce a compound (A) which includes a main fragment (G) as described. Thus, in the first embodiment, compound (A) may be of general formula

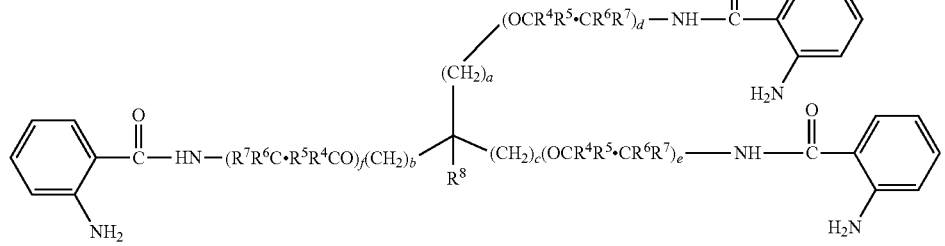

(H)

wherein $R^4$, $R^5$, $R^6$ and $R^7$, d, e, f, a, b, c are as described.

In a second embodiment, said main fragment may include atoms selected from carbon, hydrogen, oxygen and nitrogen atoms only. Said main fragment may include a moiety:

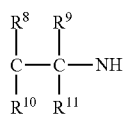

(J)

wherein $R^8$, $R^9$, $R^{10}$ and $R^{11}$ independently represent a hydrogen atom or an optionally-substituted, preferably unsubstituted, alkyl group. An alkyl group may be a $C_{1-4}$ alkyl group, preferably a $C_{1-2}$ alkyl group. Preferably, $R^8$, $R^9$, $R^{10}$ and $R^{11}$ independently represent a hydrogen atom or $C_{1-2}$ alkyl group. More preferably, $R^8$, $R^9$, $R^{10}$ and $R^{11}$ each represents a hydrogen atom. Said main fragment may include at least three moieties of formula (J) which are preferably identical.

Said main fragment of the second embodiment may include a tertiary nitrogen atom. Said main fragment may include a moiety:

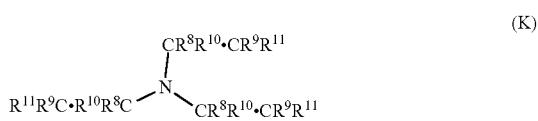

(K)

wherein $R^8$, $R^9$, $R^{10}$ and $R^{11}$ are as described. Preferably, each of $R^8$, $R^9$, $R^{10}$ and $R^{11}$ represents a methyl group or hydrogen atom and, more preferably, each represents a hydrogen atom.

Preferably, in moiety (K), at least one carbon atom of a moiety $CR^9R^{11}$ is bonded to a respective NH moiety adjacent a carbonyl moiety in a respective moiety as follows:

(L)

Other carbon atoms of moieties $CR^9R^{11}$ may be bonded to NH moieties which may be bonded to one or more other moieties of formula (K) via the carbon atom of a moiety $CR^9R^{11}$. In one embodiment, each carbon atom of a moiety $CR^9R^{11}$ may be bonded to a respective NH moiety adjacent a carbonyl moiety in a respective moiety of formula (L).

PEI-ED and tris(2-aminoethylene) amine are examples of amines which may be reacted to produce a compound (A) which includes a main fragment including moiety (K) as described.

In a third embodiment, the main fragment may include carbon, hydrogen and, optionally, nitrogen atoms only. Said main fragment may be unsaturated. Said main fragment may be aromatic. Said main fragment may include a moiety Ar' wherein Ar' represents an aromatic group containing moiety.

Moiety Ar' may include one or more aromatic rings which may include carbon and hydrogen atoms only or may include one or more heteroatoms, for example nitrogen atoms. In the third embodiment, said first fragment, said second fragment and said third fragment may be directly bonded to moiety Ar', for example at ortho, meta and para positions of Ar', when the main fragment consists of a single six-membered aromatic ring.

246T and 135TB described hereinafter are examples of amines which may be reacted to produce a compound (A) which includes a main fragment of formula Ar' as described.

As an alternative to the first fragment comprising a moiety (C) as described, said compound (A) may include first, second and third fragments which comprise a moiety

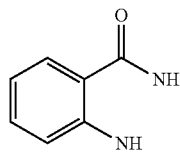

(AA)

wherein a linking moiety $L^2$ is arranged between said first, second and third fragments to which said first, second and third fragments are bonded at spaced apart positions. The linking moiety is preferably bonded to the benzene moiety.

Moiety $L^2$ may only include atoms selected from carbon, hydrogen, oxygen and nitrogen atoms.

Moiety $L^2$ preferably does not include any unsaturated carbon atoms.

Moiety $L^2$ preferably does not include any sulphur atoms or sulphur-containing groups.

Moiety $L^2$ preferably does not include any halogen atoms or halogen-containing groups.

Moiety $L^2$ may include a moiety of formula (E) or a moiety of formula (J). In moiety $L^2$, moieties of formula (E), if included, may be repeat units.

The polymeric material contacted in the method may be any polymeric material which may incorporate an aldehyde in need of being scavenged or otherwise decreased. It may comprise a polyester (especially a poly(ethylene terephthalate)), a polyurethane or a polyolefin. Preferably, it comprises a polyester, (especially a poly(ethylene terephthalate)).

A reference herein to "ppm" refers to "parts per million" by weight.

Methods for measurement of acetaldehyde in industrially injection-moulded polyethylene terephthalate preforms have been described by F I Villian et al., Journal of Polymer Science, Vol. 52, 55-60 (1994).

Said contacting step may be carried out with the polymeric material in a molten state. Alternatively, said compound (A) may be added to solid polymeric material, suitably at a temperature below the melting point of the polymeric material so the polymeric material is not in a fluid and/or molten state. In one, less preferred, embodiment, compound (A) may be added to monomers, oligomers or pre-polymers involved in the preparation of said polymeric material.

Prior to said contacting step, said polymeric material is preferably selected, suitably when in a solid state as aforesaid. Said selected polymeric material is suitably present substantially in the absence of monomers used in preparation of the polymeric material. Said selected polymeric material is preferably in a state in which it is isolated from a reaction mixture in which it may have been formed. It is preferably an isolated polymeric material. The method may include the step of drying the polymeric material prior to said contacting step. Said selected polymeric material is preferably in a particulate form, for example in the form of pellets or granules.

In said contacting step, polymeric material may be contacted with at least 50 ppm, suitably at least 250 ppm, preferably at least 500 ppm, more preferably at least 1000 ppm, especially at least 1500 ppm of compound (A) per part of polymeric material. The level of compound (A) contacted with polymeric material may be less than 5000 ppm, suitably less than 2500 ppm.

In a preferred embodiment wherein each of said first, second and third fragments comprises a moiety of formula (C), the total ppm (based on the weight of said polymeric material) of moieties of formula (C) contacted with said polymeric material is suitably at least 100 ppm, preferably 200 ppm, more preferably at least 450 ppm. It may be less than 2000 ppm or less than 1000 ppm.

Said compound (A) may be associated with, for example mixed with, an organic liquid carrier, which is compatible with said polymeric material. Typical carriers include hydrocarbons, hydrocarbon mixtures, alcohols, esters, polyethers and mixtures of two or more thereof.

A polymeric material-compatible organic liquid carrier (especially wherein said polymeric material is a polyester) may be an oil-based vehicle. Examples of such vehicles are the materials sold as Clearslip™ 2 and Clearslip™ 3 by ColorMatrix Europe Ltd, of Units 9-11 Unity Grove, Knowsley Business Park, Merseyside, L34 9GT.

The wt % of compound (A) in said mixture may be less than 60% wt %, preferably less than 50 wt %. The wt % may be in the range 10-50 wt %.

When said polymeric material is a polyester, as is preferred, said polyester is preferably a polyethylene terephthalate which term, in the context of the present specification, is intended to encompass co-polyethylene terephthalates. Co-polyethylene terephthalates of polyethylene terephthalate may contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid. Other diols which may be incorporated in the co-polyethylene terephthalates, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methyl pentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In a preferred embodiment said polyethylene terephthalate has less than 10 mole %, more preferably less than 6 mole % especially less than 2 mole % comonomer substitution. Preferably, said co-polyethylene terephthalate does not comprise co-polyethylene terephthalate; it suitably comprises substantially a homopolymer produced by esterification or transesterification of terephthalic acid or dimethyl terephthalate and ethylene glycol to produce bis(2-hydroxyethyl) terephthalate which is then subjected to polycondensation at high temperatures in vacuum in the presence of a catalyst.

As used herein the term "IV" refers to the Inherent Viscosity of the polymeric material. It may be determined on a solution of 0.5 g of polymer dissolved in 100 ml of a mixture of phenol (60% by volume) and tetrachloroethane (40% by volume).

When said polymeric material is a polyester, the IV of the polyester at the time of contact with said compound (A) is preferably greater than 0.5 dL/g, more preferably greater than 0.65 dL/g.

When said polymeric material is a polyester, the polyester may be specifically adapted for use in extrusion blow moulding (EBM). Such adaptations are known to those skilled in the art and include increasing the amount of co-monomers, altering IV and structure.

The invention extends to a method of making an article, for example a shaped article, from a polymeric material, the method comprising
(a) selecting a compound (A) as described;
(b) contacting the polymeric material with said compound (A); and
(c) forming said polymeric material into an article, for example a shaped article.

Preferably, step (b) is carried out with the polymeric material not in a fluid, for example molten, state. Thereafter, in step (c), the polymeric material is suitably melt-processed to define said article.

Said article may be defined by any process known in the art. For example, injection molding may be used to form preforms used to blow bottles, food/beverage containers, trays, or other desirable shapes. Also the polymer melts may be used in extrusion blow molding operations to provide bottles, food containers and the like. The polymer melt may similarly be fed to an extruder to produce films, sheet, profiles, pipe and the like.

Preferably, said article comprises a container or preform for a container, preferably made from a polyester as described. More preferably, said shaped article comprises a preform, for example for a bottle, such as a beverage bottle.

According to a second aspect of the invention, there is provided a polymeric material, for example polyester, having a reduced level of aldehyde, for example acetaldehyde, said polymeric material, for example polyester, incorporating a compound (A) according to the first aspect or a product of a reaction between compound (A) and aldehyde, for example acetaldehyde.

A product of a reaction between compound (A) and aldehyde, for example acetaldehyde, suitably includes a fragment derived from the first fragment as follows:

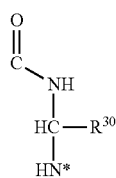
(N)

wherein the carbon atom of the carbonyl moiety and the starred (*) nitrogen atom are separated by at least one and not more than two atoms as described for said first fragment and $R^{30}$ refers to a residue of the aldehyde and is suitably a methyl group when said aldehyde is acetaldehyde.

A product of said reaction preferably includes a moiety

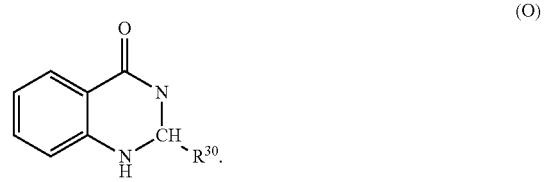
(O)

The nitrogen atom adjacent the carbonyl group is suitably bonded to a main fragment as described according to the first aspect.

Said second and third fragments of compound (A) may react with aldehyde, for example acetaldehyde, to produce a derivative as described for said first fragment and/or may be bonded to the main fragment as described.

Preferred examples of compound (A) may be made by selection of isatoic anhydride and reacting it with a compound (B) having at least three primary amine groups. Compound (B) may include three primary amine groups bonded to three free bonds of the main fragments described according to the first aspect.

In the first embodiment of the first aspect, compound (B) may be of formula

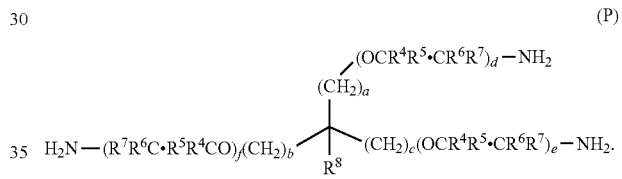
(P)

In a second embodiment of the first aspect, compound (B) may include a moiety (K) and additionally at least three —NH$_2$ groups which may be components of aminoalkyl groups which are bonded to moiety (K) directly or by means of linking atoms or groups.

In the third embodiment of the first aspect, compound (B) may include a moiety Ar' in combination with three —NH$_2$ groups.

Examples of compound (A) which include first, second and third fragments which comprise moieties (AA) with a linking moiety $L^2$ arranged between said first, second and third fragments may be made by selection of a compound comprising moiety (AA) which includes a functional group (e.g. COOH) on the benzene moiety which can be reacted with a functional group (e.g. OH) on a precursor of the linking moiety $L^2$. The precursor may be a polyhydric alcohol. Alternatively, a relevant isatoic anhydride may be selected and treated to functionalise it on its benzene moiety (e.g. it may carry a functional group on the benzene moiety) to incorporate linking moiety $L^2$ and to ring open to produce first, second and third fragments.

Thus, the invention extends to a method of making a compound (A), the method comprising reacting isatoic acid with a compound (B) as described. Preferably, in the reaction, the number of moles of isatoic acid is equal to or greater than the number of moles of primary amine in said compound (B). Thus, in the method, preferably, substantially all primary amine groups in compound (B) are functionalised, suitably so they are incorporated into amide groups in the compound (A).

Any aspect of any invention described herein may be combined with any other aspect of any invention described herein mutatis mutandis.

Specific embodiments of the invention will now be described by way of example

The following materials are referred to hereinafter:

JEFFAMINE (Trade Mark) T-403 polyetheramine of general structure shown below

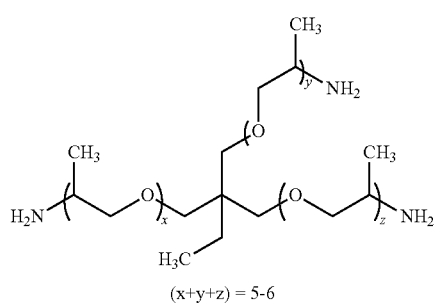

(x+y+z) = 5-6

The material is a trifunctional primary amine having molecular weight of approximately 440 Da, when measured by GPC. Its amine groups are located on secondary carbon atoms at the ends of aliphatic polyether chains.

Other JEFFAMINES include those sold under the references T-3000 and T-5000.

EPIKURE (Trade Mark) 3233—an unmodified polyoxypropylenetriamine that has high primary amine content. It has an idealized chemical structure as follows:

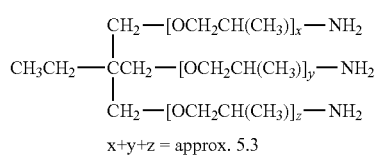

x+y+z = approx. 5.3

Polyethyleneimine, ethylene diamine branched (herein PEI-ED branched). One example (CA Number 25987-06-8), available from Sigma-Aldrich, is a liquid having an average MW of approximately 800 by LS and an average Mn of approximately 600 by GPC. The chemical structure is as follows:

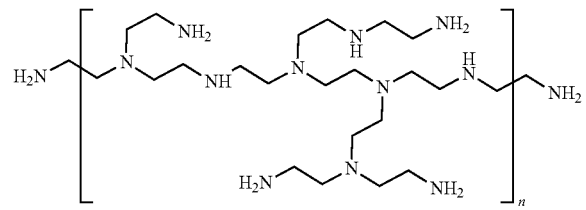

Another example, available from Sigma-Aldrich (CAS Number 9002-98-6), has an average Mn of approximately 1200 by GPC and an approximate MW of 1300 by LS.

Other examples of polyethyleneimines may include substitution of some of the hydrogen atoms of —CH$_2$ moieties with alkyl (e.g. methyl) groups.

Tris(2-aminoethyl)amine, obtainable from Sigma-Aldrich. It has a boiling point of 114° C. and a structure

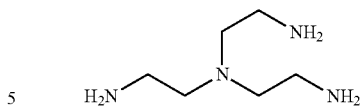

2,4,6-triaminopryimidine (herein 246T), having the structure

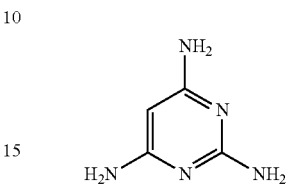

1,3,5-Tris(4-aminophenyl) benzene (herein 135T) having the structure

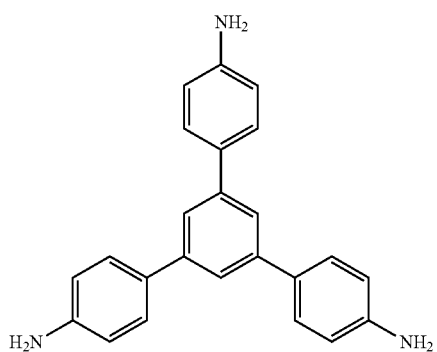 [SMILES: Nc1ccc(-c2cc(-c3ccc(N)cc3)cc(-c3ccc(N)cc3)c2)cc1]

C93 PET—refers to a widely used bottle grade PET from Voridian.

In general terms, an acetaldehyde scavenger is contacted and mixed with polyester, especially PET, and the combination (together with any other additives) is injection moulded to produce a container preform. Preforms are well known. They suitably have a test-tube like body and a threaded neck adjacent an open end, there being a capping flange associated with the neck. Preforms are arranged to be blow moulded to form a container, for example a beverage container that may be closed by a cap which releasably engages a threaded neck.

Acetaldehyde scavengers described may be solids or liquids. When they are solids, they may be provided as dispersions in a carrier, for example a mineral oil or other carrier which is compatible with the polyester into which the scavenger is to be mixed. When they are liquids, the liquid may be used directly or could be diluted by a carrier as aforesaid. In some embodiment, a carrier for an acetaldehyde scavenger may be solid at 25° C.

Acetaldehyde scavengers may be made according to the general procedure of Example 1. Bottle preforms incorporating acetaldehyde scavengers may be produced as described in Example 2. The acetaldehyde content of the preforms may be determined as described in Example 3.

EXAMPLE 1—GENERAL PROCEDURE FOR PREPARATION OF ACETALDEHYDE SCAVENGERS

Compounds having at least three primary amine groups, for example, the specific compounds detailed above, may be reacted with isatoic anhydride according to the reaction scheme below (where Mf represents "main fragment")

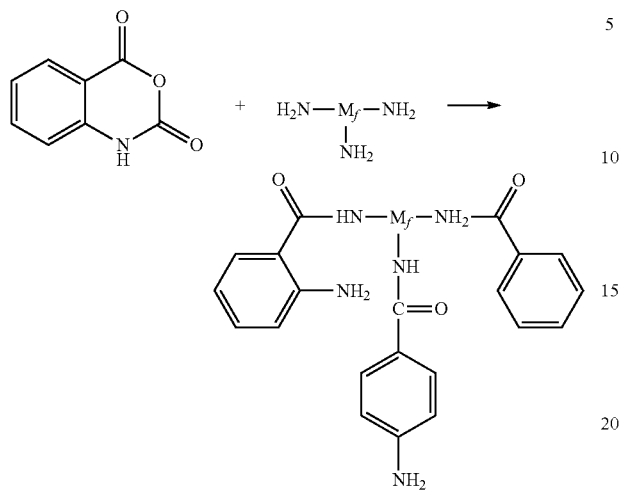

The amount of isatoic anhydride is selected to derivatise all primary amine functional groups of the amine-containing compound.

EXAMPLE 2—GENERAL PROCEDURE FOR PREPARATION OF PREFORMS

PET resin is dried prior to use using Con-Air (Trade Mark) dryers for at least four hours at 160° C.

Prior to injection moulding, acetaldehyde scavenger as a dispersion, mixture or liquid is added to hot dry PET pellets and tumble mixed to ensure good dispersion of the scavenger.

Bottle preforms can be produced using an injection moulding machine fitted with an appropriate preform tool.

EXAMPLE 3—GENERAL PROCEDURE FOR DETERMINING ACETALDEHYDE CONTENT OF PREFORM SAMPLES

The acetaldehyde content of samples is determined on preform samples that have been cryo-ground to less than 1 mm. The level of acetaldehyde is determined using an Agilent 6890N gas chromatograph with a headspace sample changer and FID detector. Acetaldehyde reductions are calculated on the basis of percentage reduction seen in the acetaldehyde levels of a preform with additives, compared to that with no additives.

EXAMPLE 4—PROCEDURE FOR MEASURING OPTICAL PROPERTIES

Plaques made in a manner similar to that described in Example 2 and relevant controls were made and optical properties (i.e. haze and L*) were assessed using a Minolta CM-3700d spectrophotometer in transmission mode fitted with a D65/10° light source.

EXAMPLE 5—PROCEDURE FOR DETERMINING MIGRATION OF ACETALDEHYDE SCAVENGER FROM PET

Bottles blown from preforms incorporating selected acetaldehyde scavengers along with relevant controls were filled with water and placed in an oven at 60° C. for predetermined times. At various times, the water was sampled using HPLC to determine the level (if any) of migration of acetaldehyde scavengers into the water.

EXAMPLE 6—PREPARATION OF ACETALDEHYDE SCAVENGER USING TRIS(2-AMINOETHYL)AMINE

The general procedure described in Example 1 was use with Tris(2-aminoethyl)amine to produce the compound below:

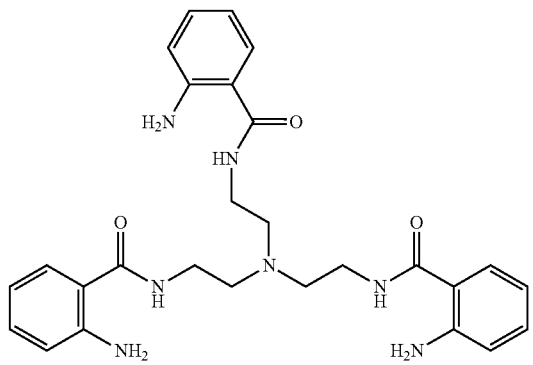 [SMILES: Nc1ccccc1C(=O)NCCN(CCNC(=O)c1ccccc1N)CCNC(=O)c1ccccc1N]

EXAMPLE 7—PREPARATION OF ACETALDEHYDE SCAVENGER USING JEFFAMINE (TRADE MARK) T-403

The general procedure described in Example 1 was used with JEFFAMINE T-403 to produce the compound below

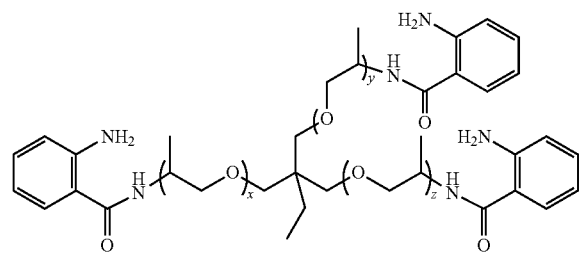

EXAMPLE 8 (COMPARATIVE), EXAMPLE 9 (COMPARATIVE) and EXAMPLE 10 (COMPARATIVE)

Other compounds were used as follows:

EXAMPLE 8—ANTHRANILAMIDE

EXAMPLE 9—

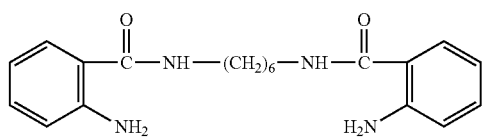

EXAMPLE 10—GRIVORY™ HB—A COMMERCIALLY AVAILABLE POLYAMIDE USED AS AN ADDITIVE IN PET BOTTLES

EXAMPLE 11—ASSESSMENT OF ACETALDEHYDE SCAVENGING ABILITY OF SELECTED MATERIALS

Using the general procedure described in Example 3, compounds described in selected examples were assessed and results are provided below.

Results relating to the acetaldehyde scavenging ability of the acetaldehyde scavenger of Example 8 are as follows:

| Description | Concentration of acetaldehyde scavenger (ppm) | Average concentration of acetaldehyde (ppm) | % aldehyde reduction compared to control |
|---|---|---|---|
| Control | 0 | 14.44 | Not applicable |
| With acetaldehyde scavenger of Example 8 | 250 | 7.38 | 49 |
| With acetaldehyde scavenger of Example 8 | 500 | 3.41 | 76 |
| With acetaldehyde scavenger of Example 8 | 1500 | 0.24 | 98 |

Results relating to the acetaldehyde scavenging ability of the acetaldehyde scavenger of Example 9 are as follows:

| Description | Concentration of acetaldehyde scavenger (ppm) | Average concentration of acetaldehyde (ppm) | % aldehyde reduction compared to control |
|---|---|---|---|
| Control | 0 | 11.74 | Not applicable |
| With acetaldehyde scavenger of Example 9 | 250 | 5.52 | 53 |
| With acetaldehyde scavenger of Example 9 | 500 | 2.98 | 75 |
| With acetaldehyde scavenger of Example 9 | 1500 | 1.26 | 89 |

Results relating to the acetaldehyde scavenging ability of the acetaldehyde scavenger of Example 6 are as follows:

| Description | Concentration of acetaldehyde scavenger (ppm) | Average concentration of acetaldehyde (ppm) | % aldehyde reduction compared to control |
|---|---|---|---|
| Control | 0 | 8.78 | Net applicable |
| With acetaldehyde scavenger of Example 6 | 250 | 3.86 | 56 |
| With acetaldehyde scavenger of Example 6 | 500 | 2.45 | 72 |
| With acetaldehyde scavenger of Example 6 | 1500 | 0.88 | 90 |

Results relating to the acetaldehyde scavenging ability of the acetaldehyde scavenger of Example 7 are as follows:

| Description | Concentration of acetaldehyde scavenger (ppm) | Average concentration of acetaldehyde (ppm) | % aldehyde reduction compared to control |
|---|---|---|---|
| Control | 0 | 9.53 | Not applicable |
| With acetaldehyde scavenger of Example 7 | 250 | 6.20 | 35 |
| With acetaldehyde scavenger of Example 7 | 500 | 4.85 | 49 |
| With acetaldehyde scavenger of Example 7 | 1500 | 2.76 | 71 |

It should be appreciated from the results that the acetaldehyde reduction achieved using the scavengers of Examples 6 and 7 is comparable to that of the commercially available scavengers of Examples 8 and 9. However, use of the scavengers of Examples 6 and 7 is found to be advantageous for other reasons discussed herein.

EXAMPLE 12—COMPARISON OF OPTICAL PROPERTIES OF PLAQUES INCORPORATING SELECTED ACETALDEHYDE SCAVENGERS

Using the general procedure described in Example 4, compounds as described in selected examples were compared.

Firstly, a comparison was undertaken between optical properties of virgin PET (C93 PET), the polyamide of Example 10 and the anthranilamide-derivative of Example 9 and results are provided below.

| Example No. of additive used | Addition rate of additive | L* of moulding | % Haze of moulding |
|---|---|---|---|
| No additive (virgin PET) | — | 89.46 | 1.99 |
| Example 10 | 0.3 wt % | 89.02 | 4.45 |
| Example 9 | 0.1 wt % | 88.51 | 2.23 |

Note that 0.3 wt % of the Example 10 material was used since the material is substantially less active (on a weight for weight basis) compared to the Example 9 material. Amounts of additives were selected to provide similar levels of acetaldehyde reduction.

The comparison illustrates how a high molecular weight material (Example 10) tends to produce significantly more haze than a lower molecular weight material. It will be appreciated that high levels of haze are undesirable.

Secondly, a comparison was undertaken between optical properties of preforms incorporating the acetaldehyde scavengers of Examples 6, 7 and comparative Examples 8 and 9 (using the procedure generally described in Example 4 applied to preforms), at a range of loadings. Between each different acetaldehyde scavenger, a new control was assessed for calibration purposes. Results are provided in the table below.

| Description | Concentration of acetaldehyde scavenger (ppm) | L*(D65) | Haze |
|---|---|---|---|
| Control 1 | — | 85.812 | 45.496 |
| With acetaldehyde scavenger of Example 8 | 250 | 85.812 | 46.142 |

-continued

| Description | Concentration of acetaldehyde scavenger (ppm) | L*(D65) | Haze |
|---|---|---|---|
| With acetaldehyde scavenger of Example 8 | 500 | 85.764 | 45.878 |
| With acetaldehyde scavenger of Example 8 | 1500 | 85.142 | 45.656 |
| Control 2 | — | 85.980 | 45.422 |
| With acetaldehyde scavenger of Example 9 | 250 | 85.818 | 46.568 |
| With acetaldehyde scavenger of Example 9 | 500 | 85.450 | 46.332 |
| With acetaldehyde scavenger of Example 9 | 1500 | 85.424 | 45.888 |
| Control 3 | — | 86.104 | 44.99 |
| With acetaldehyde scavenger of Example 6 | 250 | 85.206 | 45.162 |
| With acetaldehyde scavenger of Example 6 | 500 | 85.200 | 45.818 |
| With acetaldehyde scavenger of Example 6 | 1500 | 84.734 | 45.766 |
| Control 4 | — | 86.092 | 46.304 |
| With acetaldehyde scavenger of Example 7 | 250 | 85.584 | 45.772 |
| With acetaldehyde scavenger of Example 7 | 500 | 85.068 | 45.76 |
| With acetaldehyde scavenger of Example 7 | 1500 | 84.344 | 46.034 |

The results show that the Examples 6 and 7 acetaldehyde scavengers have surprisingly little effect on the optical properties of the bottles, despite their significantly higher molecular weights compared to the Example 8 and 9 scavengers. This result is contrary to expectations, as, for example, illustrated by the effect on optical properties when the high molecular weight Example 10 material is incorporated into PET.

EXAMPLE 13—COMPARISON OF MIGRATION OF SELECTED ACETALDEHYDE SCAVENGERS FROM PREFORMS

Using the general procedure described in Example 5, compounds as described in selected examples were compared over predetermined periods of time. For each scavenger, multiple bottles were produced and assessed.

The following tables detail results:

| HPLC Grade Water in 330 ml bottle 60° C. 1500 ppm of Example 8 scavenger | | |
|---|---|---|
| Bottle-injection | ppm of Example 8 scavenger after 10 days | ppm of Example 8 scavenger after 30 days |
| 1-1 | 0.48 | 0.68 |
| 1-2 | 0.47 | 0.69 |
| 2-1 | 0.42 | 0.65 |
| 2-2 | 0.40 | 0.68 |
| 3-1 | 0.40 | 0.70 |
| 3-2 | 0.41 | 0.72 |
| 4-1 | 0.40 | 0.64 |
| 4-2 | 0.41 | 0.65 |
| 5-1 | 0.41 | 0.71 |
| 5-2 | 0.39 | 0.68 |

| HPLC Grade Water in 330 ml bottle 60° C. 1500 ppm of Example 9 scavenger | | |
|---|---|---|
| Bottle-injection | ppm of Example 9 scavenger after 10 days | ppm of Example 9 scavenger after 30 days |
| 1-1 | ND | <0.24 |
| 1-2 | ND | <0.24 |
| 2-1 | ND | <0.24 |
| 2-2 | ND | <0.24 |
| 3-1 | ND | <0.24 |
| 3-2 | ND | <0.24 |
| 4-1 | ND | <0.24 |
| 4-2 | ND | <0.24 |
| 5-1 | ND | <0.24 |
| 5-2 | ND | <0.24 |

Note that where the ppm of scavenger is stated to be <0.24 ppm, this means that a peak was observed for the molecule. The lower limit of detection is 0.1 ppm but to quantify the amount needs to be greater than 0.24 ppm.

In the case of the Examples 6 and 7 acetaldehyde scavengers, no scavenger was observed by HPLC in the water after more than 60 days, whilst the Example 8 and 9 scavengers were detected showing the level of migration of the Example 8 and 9 scavengers is greater than for the Example 6 and 7 scavengers.

Thus, it should be appreciated that the Example 6 and 7 acetaldehyde scavengers provide high levels of acetaldehyde scavenging at acceptable additional rates in PET, whilst not significantly impacting optical properties (e.g. L* and haze) and they exhibit a low level of migration from the PET. Furthermore, the Example 6 and 7 scavengers are of relatively low volatility and exhibit relatively low volatility during processing.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A polyester, having a reduced level of acetaldehyde, said polyester incorporating a compound (A) or a product of a reaction between compound (A) and aldehyde, wherein compound (A) includes:

(I) a first fragment which comprises a moiety

(A)

and a moiety

NH (B)

wherein the carbon atom of moiety (A) and the nitrogen atom of moiety (B) are separated by at least one and not more than two atoms;

(II) a second fragment which comprises a moiety

(A)

and a moiety

 (B)

wherein the carbon atom of moiety (A) and the nitrogen atom of moiety (B) are separated by at least one and not more than two atoms; and (III) a third fragment which comprises a moiety (A)

O
‖
C—NH and a moiety

NH (B)

wherein said polyester is polyethylene terephthalate; and wherein said compound (A) is a liquid at 250° C.

2. A polyester according to claim 1, wherein the IV of the polyester is greater than 0.5 dL/g.

3. A polyester according to claim 1, wherein compound (A) includes:

(I) a first fragment which comprises a moiety (A)

O
‖
C—NH and a moiety

 (B)

wherein the carbon atom of moiety (A) and the nitrogen atom of moiety (B) are separated by at least one and not more than two atoms;

(II) a second fragment which comprises a moiety (A)

O
‖
C—NH and a moiety

NH (B)

wherein the carbon atom of moiety (A) and the nitrogen atom of moiety (B) are separated by at least one and not more than two atoms; and (III) a third fragment which comprises a moiety (A)

O
‖
C—NH and a moiety

 (B).

4. A polyester according to claim 1, wherein the carbon atom of moiety (A) and the nitrogen atom of moiety (B) are separated by two atoms which are both unsaturated carbon atoms.

5. A polyester according to claim 1, wherein said first fragment comprises a moiety:

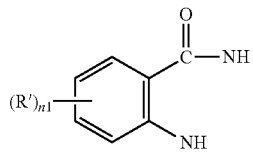 (C)

wherein R' represents a substituent and n1 is 0 to 4;

wherein moiety (B) in said first fragment is $NH_2$ and/or the NH moiety bonded to the benzene moiety is $NH_2$.

6. A polyester according to claim 5, wherein said second fragment comprises a moiety:

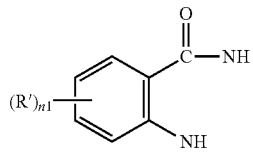 (C)

wherein R' represents a substituent and n1 is 0 to 4;

wherein moiety (B) of said second fragment is $NH_2$ and/or the NH moiety bonded to the benzene moiety is $NH_2$;

wherein said third fragment comprises a moiety:

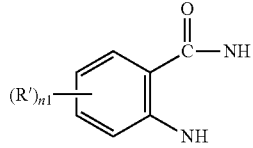 (C)

wherein R' represents a substituent and n1 is 0 to 4;

wherein moiety (B) of said third fragment is $NH_2$ and/or the NH moiety bonded to the benzene moiety is $NH_2$.

7. A polyester according to claim 1, wherein said first fragment, said second fragment and said third fragment are bonded to a main fragment of compound (A) via the nitrogen atoms of moiety CO.NH of respective moieties (A) of said first fragment, said second fragment and said third fragment.

8. A polyester according to claim 7, wherein said main fragment consists of carbon and hydrogen atoms and only one other type of atom which is selected from oxygen and nitrogen atoms.

9. A polyester according to claim 8, wherein said main fragment is saturated.

10. A polyester according to claim 9, wherein said main fragment includes no primary amine moieties except primary amine moieties which are separated from a carbonyl moiety by at least one and not more than two atoms.

11. A polyester according to claim 1, wherein compound (A) includes first, second and third fragments which comprise a moiety

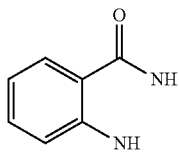
(AA)

wherein a linking moiety L² is arranged between said first, second and third fragments to which said first, second and third fragments are bonded at spaced apart positions, wherein the linking moiety is bonded to the benzene moieties of moiety (AA).

12. A polyester according to claim 1, wherein:
the carbon atom of moiety (A) and the nitrogen atom of moiety (B) are separated by two atoms which are both unsaturated carbon atoms;
said first fragment comprises a moiety:

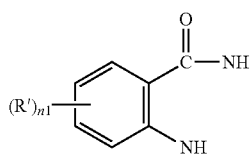
(C)

wherein R' represents a substituent and n1 is 0 to 4;
moiety (B) in said first fragment is NH₂ and/or the NH moiety bonded to the benzene moiety is NH₂;
said second fragment comprises a moiety:

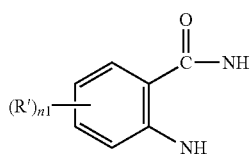
(C)

wherein R' represents a substituent and n1 is 0 to 4;
moiety (B) of said second fragment is NH₂ and/or the NH moiety bonded to the benzene moiety is NH₂;
said third fragment comprises a moiety:

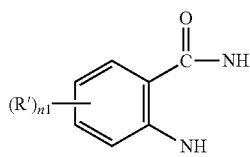
(C)

wherein R' represents a substituent and n1 is 0 to 4; and
wherein moiety (B) of said third fragment is NH₂ and/or the NH moiety bonded to the benzene moiety is NH₂.

13. A polyester according to claim 1, wherein:
said first fragment, said second fragment and said third fragment are bonded to a main fragment of compound (A) via the nitrogen atoms of moiety CO.NH of respective moieties (A) of said first fragment, said second fragment and said third fragment, wherein said main fragment is saturated;

said main fragment includes substantially no primary amine moieties except primary amine moieties which are separated from a carbonyl moiety by at least one and not more than two atoms.

14. A polyester according to claim 2, wherein compound (A) includes:
a first fragment which comprises a moiety:

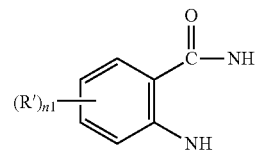
(C)

wherein R' represents a substituent and n1 is 0 to 4,
wherein moiety (B) in said first fragment is NH₂ and/or the NH moiety bonded to the benzene moiety is NH₂;
a second fragment which comprises a moiety:

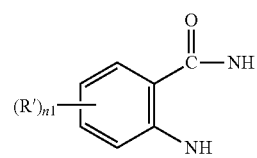
(C)

wherein R' represents a substituent and n1 is 0 to 4;
wherein moiety (B) of said second fragment is NH₂ and/or the NH moiety bonded to the benzene moiety is NH₂;
a third fragment which comprises a moiety:

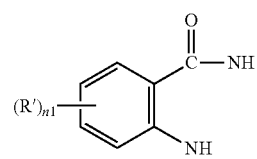
(C)

wherein R' represents a substituent and n1 is 0 to 4.

15. A container or preform for a container, wherein said container or preform comprise a polyester as claimed in claim 1.

16. A container or preform according to claim 15, wherein said first fragment comprises a moiety:

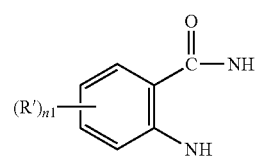
(C)

wherein R' represents a substituent and n1 is 0 to 4;
wherein moiety (B) in said first fragment is NH₂ and/or the NH moiety bonded to the benzene moiety is NH₂;

wherein said second fragment comprises a moiety:

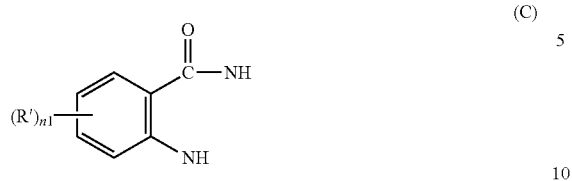
(C)

wherein R' represents a substituent and n1 is 0 to 4;
wherein moiety (B) of said second fragment is $NH_2$ and/or the NH moiety bonded to the benzene moiety is $NH_2$;
wherein said third fragment comprises a moiety:

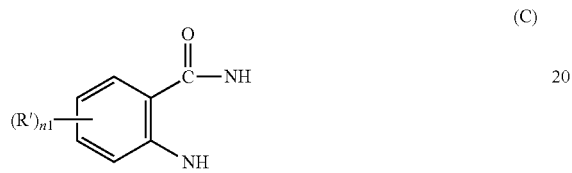
(C)

wherein R' represents a substituent and n1 is 0 to 4;
wherein moiety (B) of said third fragment is $NH_2$ and/or the NH moiety bonded to the benzene moiety is $NH_2$.

* * * * *